(12) United States Patent
Van Wynsberghe et al.

(10) Patent No.: US 6,213,548 B1
(45) Date of Patent: Apr. 10, 2001

(54) HEAD RESTRAINT APPARATUS

(75) Inventors: Roy D. Van Wynsberghe, Mesa; Ahmad K. Al-Amin, Higley; Jess A. Cuevas, Scottsdale; Bryan W. Shirk; Timothy A. Swann, both of Mesa; John P. O'Loughlin; Wael S. Elqadah, both of Gilbert, all of AZ (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/373,875

(22) Filed: Aug. 12, 1999

(51) Int. Cl.[7] .............................. B60N 2/42; B60R 21/00; B60R 21/32
(52) U.S. Cl. ................................ 297/216.12; 297/216.1; 297/391; 297/220
(58) Field of Search ........................... 297/216.12, 216.1, 297/391, 220

(56) References Cited

U.S. PATENT DOCUMENTS

| | | | |
|---|---|---|---|
| 3,420,572 | 1/1969 | Bisland . | |
| 3,680,912 | * 8/1972 | Matsuura | 297/216.12 X |
| 3,804,458 | * 4/1974 | Jannoni | 297/220 |
| 3,838,870 | * 10/1974 | Hug | 297/216.12 X |
| 4,278,291 | * 7/1981 | Asai | 297/216.12 X |
| 4,657,304 | * 4/1987 | Heesch et al. | 297/391 |
| 4,693,515 | * 9/1987 | Russo et al. | 297/391 |
| 4,762,367 | * 8/1988 | Denton | 297/391 X |
| 4,856,848 | * 8/1989 | O'Sullivan et al. | 297/391 |
| 4,883,243 | * 11/1989 | Herndon | 297/216.12 X |
| 4,890,885 | 1/1990 | Grossmann | 297/284.1 |
| 5,110,185 | 5/1992 | Schmutz et al. | 297/410 |
| 5,290,091 | * 3/1994 | Dellanno et al. | 297/216.12 X |
| 5,738,412 | * 4/1998 | Aufere et al. | 297/216.12 X |
| 5,772,280 | * 6/1998 | Massara | 297/216.12 |
| 5,820,211 | 10/1998 | Heilig et al. | 297/216.12 |
| 5,842,738 | * 12/1998 | Knoll et al. | 297/216.12 |
| 5,882,071 | 3/1999 | Fohl | 297/216.12 |
| 5,884,968 | * 3/1999 | Massara | 297/216.12 |
| 5,904,405 | * 5/1999 | Wu | 297/216.12 X |
| 5,934,750 | * 8/1999 | Fohl | 297/216.12 |

OTHER PUBLICATIONS

Co-pending U.S. Patent appln. Ser. No. 08/800,023, filed Feb. 13, 1997, entitled "Vehicle Seat", now U.S. Pat. No. 5,934,750.

* cited by examiner

*Primary Examiner*—Peter M. Cuomo
*Assistant Examiner*—Rodney B. White
(74) *Attorney, Agent, or Firm*—Tarolli, Sundheim, Covell, Tummino & Szabo L.L.P.

(57) ABSTRACT

A headrest apparatus (10) for a vehicle seat (14) includes first and second relatively movable cushion portions (18a, 18b). An outer covering (16) for the first and second cushion portions has a head engaging portion (19) for engaging the head (21) of a vehicle occupant. The apparatus (10) further includes actuatable means (36) located within the outer covering (16) which, upon the occurrence of a vehicle crash event, moves the head engaging portion (19) of the outer covering (16) and one (18a) of said cushion portions relative to the other cushion portion (18b) in a direction toward the head (21) of the occupant of the vehicle seat (14).

7 Claims, 2 Drawing Sheets

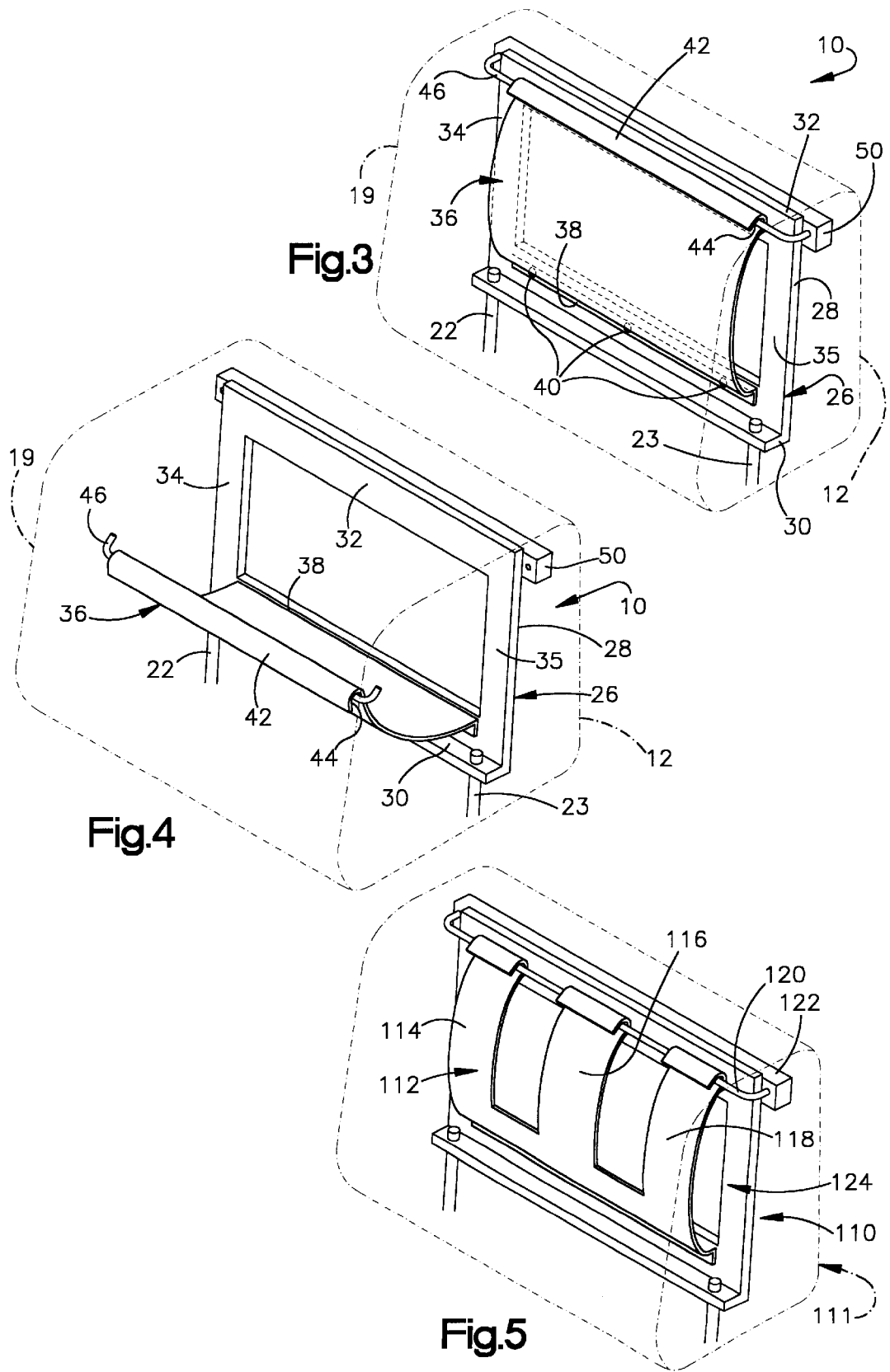

HEAD RESTRAINT APPARATUS

FIELD OF THE INVENTION

The present invention is directed to an apparatus for helping to protect a vehicle occupant during a vehicle crash event and, more particularly, to an actuatable headrest apparatus which may be actuated to help protect a vehicle occupant during a vehicle crash event.

BACKGROUND OF THE INVENTION

In order to help protect a vehicle occupant, a vehicle is equipped with one or more actuatable vehicle protection devices. Certain vehicle occupant protection devices are head and neck protection devices which help protect the head and neck of a vehicle occupant in a rear impact. It is known to construct such protection devices as part of a vehicle seat.

For example, U.S. Pat. No. 3,420,572 to Bisland discloses an automatic headrest and neck protector as part of a vehicle seat in which a plate is raised behind the head and neck of the vehicle occupant to prevent sudden backward movement of the occupant's head.

U.S. Pat. No. 5,110,185 to Schmutz et al. discloses an actuatable headrest device that includes a rollover bar which is extended beyond the upper end of a backrest of a seat to help protect an occupant of the seat during a vehicle rollover condition.

U.S. Pat. No. 4,890,885 to Grossmann discloses a seat having an integrated headrest with an air bladder. The air bladder is inflated by a remotely located air pump upon actuation of a manual switch.

SUMMARY OF THE INVENTION

The present invention is directed to a vehicle headrest apparatus for a vehicle seat. The headrest apparatus includes first and second relatively movable cushion portions and an outer covering for the cushion portions. The outer covering has a head engaging portion for engaging the head of an occupant of the vehicle seat. The headrest apparatus further includes actuatable means located within the outer covering which, when actuated during a vehicle crash event, effects movement of the head engaging portion of the outer covering and one of said cushion portions relative to the other cushion portion in a direction toward the head of the occupant of the vehicle seat.

BRIEF DESCRIPTION OF THE DRAWINGS

The foregoing and other features and advantages of the present invention will become apparent to those skilled in the art to which the present invention relates upon reading the following description with reference to the accompanying drawings, wherein:

FIG. 3 is an isometric view of part of the apparatus of FIG. 1;

FIG. 4 is an isometric view similar to FIG. 3 showing parts in a different position; and FIG. 5 is an isometric view of a second embodiment of a headrest apparatus in accordance with the present invention.

DESCRIPTION OF PREFERRED EMBODIMENTS

Figure 2:
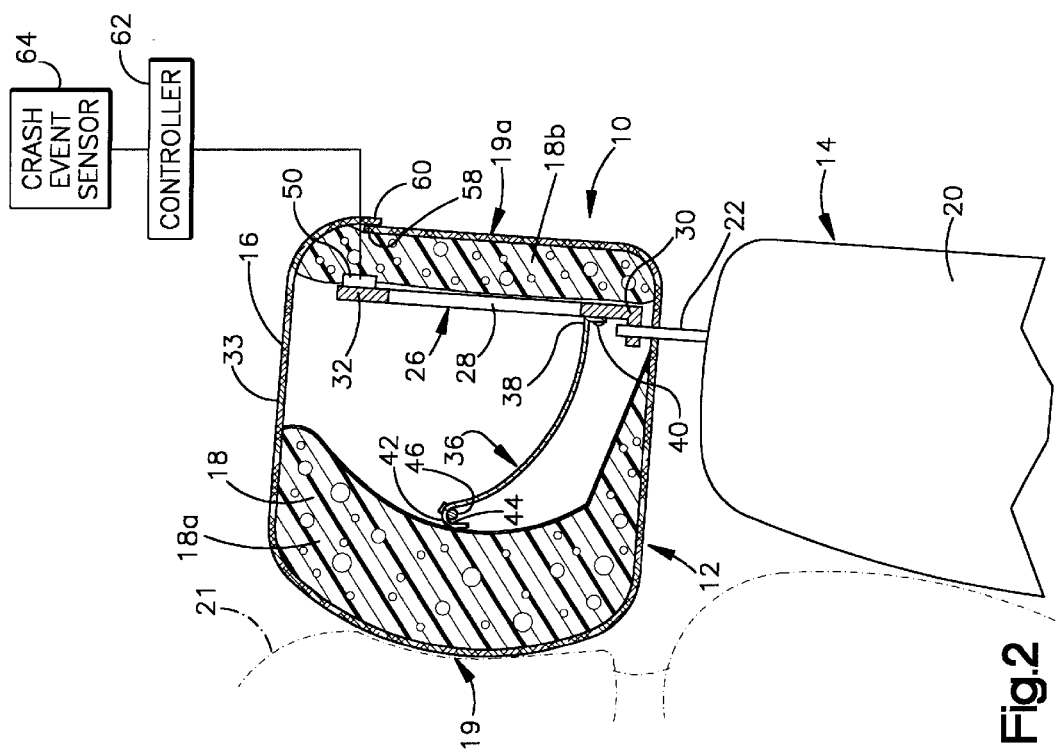
FIG. 2 is a view, similar to FIG. 1, illustrating a second condition of the headrest apparatus of FIG. 1.

FIGS. 1–4 illustrate a headrest apparatus 10 in accordance with a first embodiment of the present invention. The apparatus 10 includes a headrest 12 of a vehicle seat 14. The headrest 12 includes an outer covering 16 which encloses a volume of a suitable foam or cushion material 18. The cushion material includes two cushion portions 18a, 18b which are movable relative to one another. The outer covering has a head engaging portion 19 configured for engaging the head 21 of a vehicle occupant and a rearward facing side 19a.

A pair of substantially rigid arms 22 and 23 (FIG. 3), preferably formed of metal, connect the headrest 12 with the top of a seat back portion 20 of the vehicle seat 14. The arms 22 and 23 also may be used to adjust the vertical height of the headrest 12 relative to the seat back 20 in a known manner. The arms 22 and 23 are spaced apart laterally of the forward direction of vehicle travel and are connected with a substantially rigid support assembly 26 mounted within the interior of the headrest 12. A single arm could alternatively be used as a substitute for arms 22, 23.

The assembly 26, as illustrated in FIGS. 3 and 4, includes a generally rectangular support bracket 28 having a first end 30 affixed to the arms 22 and 23. The arms 22 and 23 support the bracket 28 on the seat back portion 20. The bracket 28 also has a second end 32 spaced vertically apart from the first end 30 by lateral supports 34 and 35. The second end 32 of the bracket is positioned adjacent an upper end 33 of the headrest 12. The entire assembly 26 preferably is surrounded by the foam or cushion material 18. The cushion portion 18a is interposed between the bracket 28 and the head engaging portion 19 of the outer covering 16. The cushion portion 18b is interposed between the bracket 28 and the rear facing side 19a of the outer covering 16. The bracket 28 is disposed between the head engaging portion 19 and rear facing side 19a of the outer covering 16 and extends laterally generally parallel with the head engaging portion 19 of the outer covering 16.

While the bracket 28 is illustrated as a hollow, rectangular frame, other shapes and configurations for the support bracket, such as a solid frame or a circular bracket, also may be used.

Figure 1:
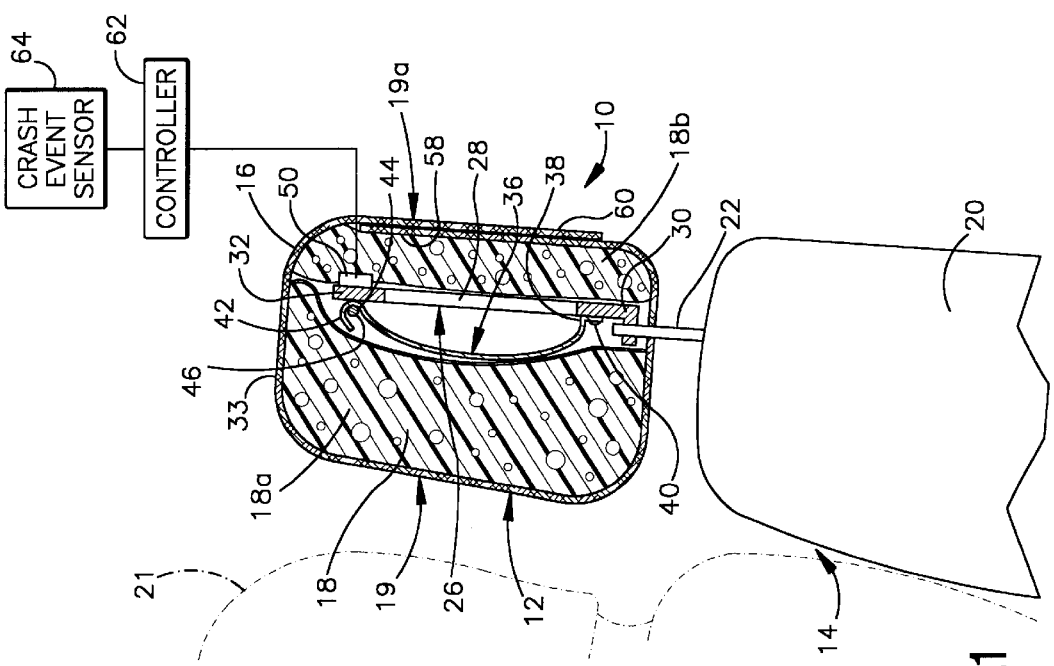
FIG. 1 is a side view, partially in section, of an apparatus in accordance with a first embodiment of the present invention, illustrating a first condition of a headrest apparatus.

The apparatus 10 also includes a spring 36 connected with the bracket 28 within the headrest 12. The spring 36 is formed of a sheet of resilient material, such as a metal or a resilient composite material. The spring 36 has a first end portion 38 fixedly attached to the lower end 30 of the support bracket 28 by fasteners 40. The spring 36 also has a second end portion 42 spaced vertically apart from the first end portion 38. In FIGS. 1 and 3, the spring 36 is shown in a tensioned condition in which the second end portion 42 of the spring 36 is resiliently bent toward and releasably positioned adjacent the second end 32 of the support bracket 28. The spring 36 has a substantial amount of potential energy when in the tensioned condition and is not plastically deformed when bent to its tensioned condition shown in FIGS. 1 and 3.

A longitudinal channel or groove 44 is formed along the second end portion 42 of the spring 36. The channel 44 is dimensioned and configured for receiving a load bearing strip or wire 46 which comprises a frangible member that holds the spring 36 in the tensioned condition shown in FIGS. 1 and 3. The load bearing strip 46 preferably is formed of a shape memory alloy such as Nitinol.

While the load bearing member 46 is illustrated as a strip that is received within the channel 44, other retaining mechanisms also may be used to hold the spring 36 in the tensioned condition.

Also, the spring 36 alternatively may be a coil spring oriented to expand substantially transverse to the bracket 28 toward the head engaging side portion 19. Such a coil spring would be compressed against the bracket 28 and held in a compressed, tensioned condition by a suitable retaining mechanism. As another alternative, rather than acting directly on the cushion material 18, the spring 36 may act on a plunger that acts on the cushion material.

The apparatus 10 also includes an actuatable release mechanism 50 mounted within the headrest 12 and operatively connected with the spring 36. When the release mechanism 50 is actuated, the spring 36 moves rapidly from the tensioned condition, shown in FIGS. 1 and 3, to a released condition, illustrated in FIGS. 2 and 4. This results in transferring potential energy from the tensioned spring 36 to the cushion material 18 and outer covering 16. Movement of the spring 36 to the released condition causes an increase in the exterior surface area of the outer covering 16 of the head rest 12 and movement of at least a part of the cushion material 18 and outer covering 16 toward the head 21 of the occupant of the vehicle seat 14. This reduces the distance between the occupant's head and the headrest 12. Thus, the spring 36 and release mechanism 50 comprise an actuatable means located within the outer covering 16 which, when actuated, effects movement of the head engaging portion 19 of the outer covering 16 toward the head 21 of the occupant of the vehicle seat 14.

In the embodiment of FIGS. 1–4, the release mechanism 50 is positioned at the upper end 32 of the bracket 28 and is connected to the load bearing strip 46. The release mechanism 50, when actuated, causes an electric current to flow through the strip 46 which reduces the mechanical strength of the strip 46 to cause it to fail structurally (break) due to the force of the spring 36 acting on the strip. The release mechanism 50 may include an electric circuit configured to provide a sufficient amount of electric current to reduce the mechanical strength of the load bearing strip 46 so that the spring 36 can break the strip 46.

The release mechanism 50 also may be a suitable pyrotechnic device or electrical device that is activated in response to a control signal from a controller 62 to actuate a latch mechanism to effect the release of the spring 36 from its tensioned condition.

When the load bearing strip 46 structurally fails (breaks), the spring 36 moves from the tensioned condition, shown in FIGS. 1 and 3, to the released condition, shown in FIGS. 2 and 4. The movement of the spring 36 causes interior contents of the headrest 12, including at least the cushion portion 18a, to move away from the bracket 28. Movement of the cushion portion 18a, in turn, causes movement of the outer covering 16. This results in a substantial increase in the external surface area of the headrest 12.

The outer covering 16 of the headrest 12 is formed of a suitable material, such as a cloth or textile, leather, vinyl or other appropriate flexible material. Preferably, the outer covering 16 encloses the cushion material 18 and the assembly 26 so that end portions 58 and 60 of the outer covering overlap, such as shown in FIG. 1. The outer end portion 60 is attached to the radially inner end portion 58 with a tear-away seam. The overlapping end portions 58 and 60 provide material to permit expansion of the exposed surface area of the outer covering 16. The spring 36 breaks the tear-away seam and reduces the amount of overlap between end portions 58 and 60, as illustrated in FIG. 2, when the release mechanism 50 releases the spring.

An additional length of material also may be sewn within the outer covering 16 with a tear-away seam to enable the outer covering to expand. Alternatively, the outer covering 16 may be formed of a flexible or expandable material, such as Lycra or a similar material, that permits a desired increase in exterior surface area without a tear-away seam. Each of these alternative approaches enables the outer covering 16 to expand toward the occupant's head 21 in response to movement of the spring 36 and remain intact while enclosing the cushion material 18.

Referring to FIGS. 1 and 2, the release mechanism 50 is integrated with a vehicle occupant safety controller 62 to control activation of the apparatus 10. The controller 62 preferably includes a microprocessor programmed for controlling actuation of the release mechanism 50. The controller 62 is electrically connected with a vehicle crash event sensor 64, such as an accelerometer, an inertia sensing device, a crush zone sensor, or another known crash sensing device.

When the crash sensor 64 detects a vehicle crash event, the crash sensor provides a crash sensor signal to the controller 62. If the controller 62 determines that the sensor signal indicates a desirability to restrain the head 21 of a vehicle occupant, such as during a rear impact, the controller 62 provides a control signal to the release mechanism 50. The controller 62 may provide the control signal to the release mechanism 50 over a wired or wireless communications link. In response to the control signal, the release mechanism 50 effects the release of the spring 36, such as by causing structural failure of the load bearing strip 46. The potential energy of the spring 36 is transferred to the internal contents of the headrest 12, including the cushion portion 18a. This results in movement of the cushion portion 18a and at least a portion of the outer covering 16 toward the occupant's head and away from the bracket 28 to reduce the distance between the occupant's head 21 and the head engaging portion 19 of the outer covering 16. This advantageously helps to minimize movement of the occupant's head that typically occurs in a rear impact.

FIG. 5 illustrates an apparatus 110 in accordance with an alternative embodiment of the present invention. The apparatus 110 is mounted within a headrest 111. The apparatus 110 includes a spring 112 in the form of a sheet having a plurality of spaced apart fingers 114, 116, and 118, suitably formed of metal, such as spring steel. Each of the fingers 114, 116, and 118 is held in a tensioned position by a load bearing strip or support 120. The load bearing strip 120 in this embodiment is substantially identical to the strip 46 described above, although separate load bearing strips may be used with each finger 114, 116, and 118 to provide selectable actuation of each finger. The load bearing strip 120 may be broken upon actuation of an associated release mechanism 122, as described above.

Activation of the apparatus 110 is substantially identical to that described above. Specifically, a controller (not shown) causes the release mechanism 122 to effect release of each of the fingers 114, 116, and 118 in response to detecting a vehicle crash event. Each of the spaced apart fingers 114, 116, and 118 engages a different portion of the interior volume of the headrest 111 to urge the interior contents and a portion of the outer covering away from a support bracket 124. This results in an increase in the exterior surface area of the headrest 111 and a reduction in the distance between the occupant's head and the headrest 111.

From the above description of the invention, those skilled in the art will perceive improvements, changes and modifications. Such improvements, changes and modifications within the skill of the art are intended to be covered by the appended claims.

Having described the invention, the following is claimed:

1. A headrest apparatus comprising:

an outer covering having an exterior surface area;

a rigid support positioned within said outer covering;

a spring located within said outer covering and operatively connected with said support, said spring having a first, tensioned position and a second position to which the spring moves from said first position; and a member which holds said spring in said first, tensioned position and which releases said spring for movement from said first position to said second position, said spring moving a portion of the exterior surface of said outer covering when moving to said second position.

2. The apparatus of claim 1 further including a cushion material interposed between said outer covering and said spring, said spring, when moving to said second position, moving at least a portion of said cushion material and at least a portion of said outer covering away from said support.

3. The apparatus of claim 1 further including a sensor which is effective to sense the occurrence of a vehicle crash event and to provide a signal upon sensing the vehicle crash event, said member releasing said spring from the first position in response to said signal.

4. A headrest apparatus for a vehicle seat, said headrest apparatus comprising:

first and second relatively movable cushion portions;

an outer covering for said first and second cushion portions, said outer covering having a head engaging portion for engaging a head of an occupant of the vehicle seat; and actuatable release means located within said outer covering which, when actuated during a vehicle crash event, is effective to move the head engaging portion of said outer covering and one of said cushion portions relative to the other of said cushion portions in a direction toward the head of the occupant of the vehicle seat, said movement of said one of said cushion portions effecting movement of said head engaging portion of said outer covering toward the head of the occupant of the vehicle seat, said actuatable means including a spring having a first, tensioned condition and an actuatable release mechanism for holding said spring in said first condition, said actuatable means, when actuated, enabling said spring to move to a second condition, said spring when moving to said second condition moving said one cushion portion and said outer covering toward the head of the occupant of the vehicle seat.

5. The apparatus of claim 4 wherein said apparatus further includes means for actuating said release mechanism upon an occurrence of a vehicle crash event.

6. A headrest apparatus for a vehicle seat, said headrest apparatus comprising:

first and second relatively moveable cushion portions;

an outer covering for said first and second cushion portions, said outer covering encircling said first and second cushion portions and having a head engaging portion for engaging a head of an occupant of the vehicle seat; and actuatable means located within said outer covering which, when actuated during a vehicle crash event, is effective to move the head engaging portion of said outer covering and one of said cushion portions relative to the other of said cushion portions in a direction toward the head of the occupant of the vehicle seat.

7. The apparatus of claim 6 wherein the movement of said one of said cushion portions effects movement of said head engaging portion of said outer covering toward the head of the occupant of the vehicle seat.

* * * * *